United States Patent
Audityan et al.

(10) Patent No.: US 6,516,420 B1
(45) Date of Patent: Feb. 4, 2003

(54) DATA SYNCHRONIZER USING A PARALLEL HANDSHAKING PIPELINE WHEREIN VALIDITY INDICATORS GENERATE AND SEND ACKNOWLEDGEMENT SIGNALS TO A DIFFERENT CLOCK DOMAIN

(75) Inventors: Srinath Audityan, Austin, TX (US); Chris Randall Stone, Austin, TX (US); Ritesh Radheshyam Agrawal, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/426,265

(22) Filed: Oct. 25, 1999

(51) Int. Cl.[7] ............................ G06F 13/42; H04L 7/06; H04L 7/04
(52) U.S. Cl. .................. 713/400; 375/370; 327/145
(58) Field of Search .................... 713/400; 327/144, 327/145; 375/270

(56) References Cited

U.S. PATENT DOCUMENTS

| | | | |
|---|---|---|---|
| 4,683,534 A | 7/1987 | Tietjen et al. ............... 364/200 |
| 4,954,987 A | 9/1990 | Auvinen et al. ........ 365/189.02 |
| 5,155,810 A | 10/1992 | McNamara, Jr. et al. ... 395/250 |
| 5,262,997 A | 11/1993 | Lee ............... 365/221 |
| 5,287,481 A | 2/1994 | Lin ............... 395/425 |
| 5,295,246 A | 3/1994 | Bischoff et al. ............ 395/250 |
| 5,327,545 A | 7/1994 | Begun et al. ............... 395/425 |
| 5,333,271 A * | 7/1994 | Fredericks et al. ......... 709/231 |
| 5,434,892 A * | 7/1995 | Dike et al. .................. 375/377 |
| 5,473,755 A | 12/1995 | Dunning ............... 395/250 |
| 5,487,092 A * | 1/1996 | Finney et al. ............... 375/354 |
| 5,602,850 A | 2/1997 | Wilkinson et al. ........... 370/402 |
| 5,781,802 A | 7/1998 | Cassetti ............... 395/877 |
| 5,867,731 A * | 2/1999 | Williams et al. ............ 709/240 |
| 6,055,354 A * | 4/2000 | Bopardikar ................ 386/109 |
| 6,087,867 A * | 7/2000 | Holm ........................ 327/141 |
| 6,359,479 B1 * | 3/2002 | Oprescu ..................... 327/141 |

FOREIGN PATENT DOCUMENTS

EP  0 489 504 A2  11/1991  ........... G06F/13/28

OTHER PUBLICATIONS

Jerry M. Rosenberg, "Dictionary of Computers, Information Processing & Telecommunications", Second Edition, John Wiley & Sons, Inc., 1984, 4 pgs.

* cited by examiner

*Primary Examiner*—Thomas Lee
*Assistant Examiner*—James K. Trujillo
(74) *Attorney, Agent, or Firm*—Joanna G. Chiu; Robert L. King

(57) ABSTRACT

A data synchronizer transfers information across an asynchronous interface by using system domain and core domain logic on either side of the asynchronous interface. Information registers receive data beats from a data bus coupled to an external system. Each data beat is loaded into the registers in sequential order. A corresponding system valid bit is provided for each register and is set when the corresponding register is loaded. In the core domain, a corresponding set of core valid bit registers is set in response to the system valid bit registers being set. A data sampler monitors the core valid bits in sequential order and controls a multiplexor to select a corresponding one of the registers that contains valid data. The data sampler resets the core valid bits which in-turn reset the system valid bits to signal the completion of a data transfer across the asynchronous interface.

20 Claims, 5 Drawing Sheets

DATA SYNCHRONIZER USING A PARALLEL HANDSHAKING PIPELINE WHEREIN VALIDITY INDICATORS GENERATE AND SEND ACKNOWLEDGEMENT SIGNALS TO A DIFFERENT CLOCK DOMAIN

CROSS-REFERENCE TO RELATED APPLICATIONS

This application is related to U.S. patent application Ser. No. 09/366,773, filed Aug. 4, 1999, by Stone et al. and entitled "System and Method To Transfer Information Across An Asynchronous Interface", which is a continuation-in-part of U.S. patent application Ser. No. 09/271,215, filed Mar. 17,1999, by Stone et al. and entitled "Data Processing System Having a FIFO Buffer With Variable Threshold Value", both of which are assigned to the assignee herein.

FIELD OF THE INVENTION

The present invention relates to transferring information across an asynchronous interface and, more particularly, to a high-performance, error free data synchronization using a parallel handshake pipeline.

BACKGROUND OF THE INVENTION

System designers are faced with the need to integrate more features and capabilities into a given system and to provide higher performance interfaces between different systems. The need for integrating high performance system features further includes support for synchronous and asynchronous system interfaces. Asynchronous interfaces provide system designers with greater flexibility by relieving them of the strong clocking requirements of a synchronous system. Asynchronous interfaces, however, have many disadvantages such as extra latency for data synchronization and the increased probability of data corruption during data transfer.

Data corruption primarily occurs because of metastability across an asynchronous interface. Metastability has been very well investigated in the past and there are several known solutions. The known solutions have an undesirable trade-off between performance and reliability. In particular, the known solutions are either very good in performance with less immunity to error, or are error-free with poor performance. For example, a first known solution is to provide a full handshake between the transmitting device and the receiving device. The full handshake method, although error free, has a very high latency to transfer data, thereby reducing the performance considerably. Each transaction requires four or more receiver clock cycles to transfer the data. Thus, the full handshake method eliminates the metastability problem and is error free, but has very low performance and is not applicable for high performance designs.

A second known solution utilizes synchronizing latches to sample a data valid signal across an asynchronous interface. The data valid signal passes through the synchronizing latches to reduce the probability of a metastable condition. This second method is useful for high performance applications since data is read on every cycle of the core domain. However, this method still has several potential disadvantages, such as, the same data may be read twice or may be skipped completely because of metastability. Either scenario causes loss of data which may seriously affect system functionality since transaction information is lost in the transfer. This technique is not desired in high performance systems where re-transmission of data comes at a very high cost. This method also suffers from very poor debug capabilities and there is no mechanism to throttle or control the flow of incoming data.

It is therefore desired to provide a system and method for transferring data across an asynchronous interface at a very high throughput for use in high performance systems while also reducing or otherwise eliminating transfer errors. It is also desired to provide throttle control and debug capabilities.

DETAILED DESCRIPTION OF THE DRAWINGS

Figure 1:
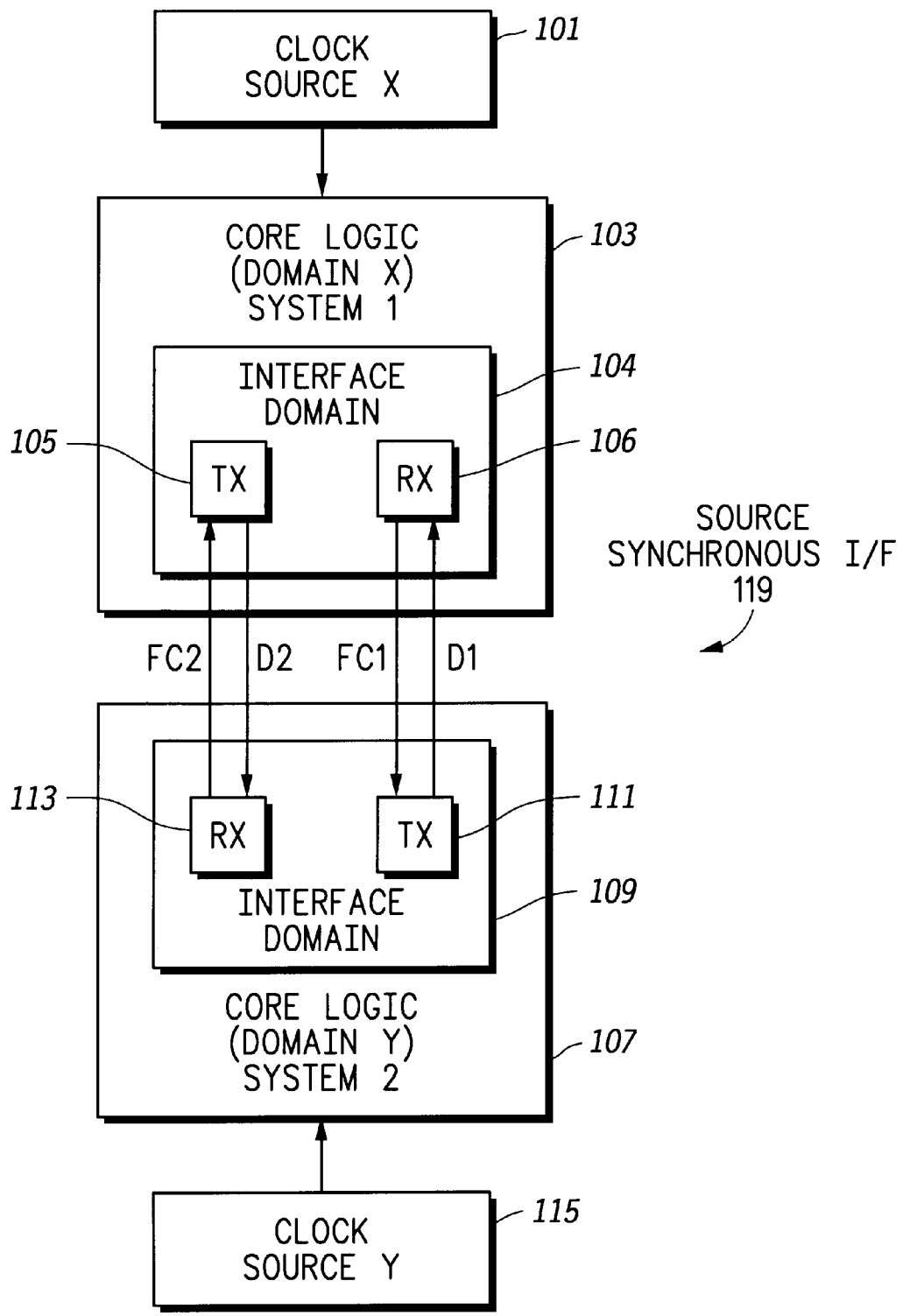
FIG. 1 illustrates a block diagram of an interface between two different systems each having a separate and independent clock source.

FIG. 1 is a block diagram of two different systems with separate clocks interfaced together utilizing a parallel full handshake pipeline synchronizer according to the present invention. A first clock source 101 provides the clocking to a first system 103 shown as SYSTEM 1. The clock source 101 establishes a domain X for core logic of the system 103. The system 103 includes an interface domain 104 with a transmitter (TX) 105 for transmitting data from the system 103. The interface domain 104 also includes a receiver (RX) 106 that receives data from an external source on a data bus D1 and transfers the data to the core logic of the system 103. The receiver 106 asserts a flow control signal FC1 to prevent overflow.

A second system 107, shown as SYSTEM 2, also includes an interface domain 109 with a transmitter 111 that transmits data from the system 107 to the receiver 106 of the system 103. Also, the interface domain 109 includes a receiver 113 for receiving data on a data bus D2 from the system 103. The receiver 113 asserts another flow control signal FC2 to the transmitter 105 to prevent overflow. The system 107 operates in a domain Y receiving its clock from a clock source 115. It is noted that the clock sources 101 and 115 are separate and independent, where the clock source 101 establishes the domain X and where the clock source 115 establishes the domain Y. A system interface (I/F) 119 between the systems 103 and 107 is a source synchronous interface (I/F) so that the interface between the receivers 106 and 113 and the respective core logic of the respective systems 103 and 107 are asynchronous. The interface between the core logic and the transmitters 105, 111 of the respective systems 103, 107 may be synchronous or asynchronous depending on the particular topology chosen for system implementation.

Figure 2:
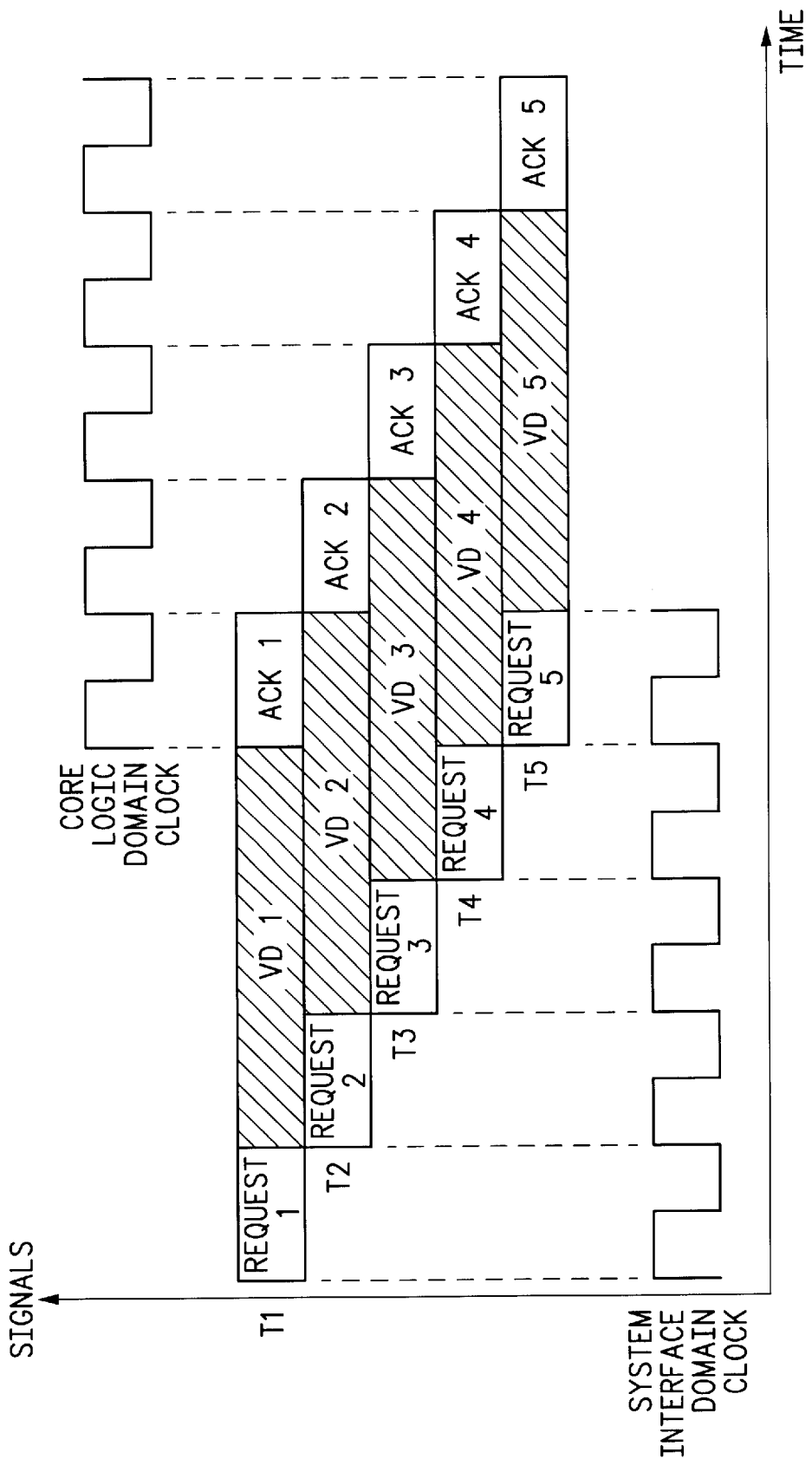
FIG. 2 is a timing diagram illustrating the parallel pipelining of data in accordance with the present invention.

FIG. 2 is a timing diagram illustrating the parallel pipelining of data transfer from the receiver of an interface domain to the core logic, such as from the receiver 106 to the core logic of the system 103, or from the receiver 113 to the core logic of the system 107. As described in detail below, data is transmitted across the source synchronous interface 119 and latched into a respective receiver. The receiver (106, 113) submits to its respective core logic (system 103, 107) a corresponding service request (REQUEST 1, etc.) for each beat or frame of data sampled from a bus of the source synchronous interface 119. Five transactions are shown, individually labeled T1, T2, T3, T4, and T5, synchronized with the respective system interface domain clock. Each of transactions T1–T5 is initiated with a corresponding service request signal, shown as REQUEST 1, REQUEST 2, REQUEST 3, REQUEST 4 and REQUEST 5, respectively, to the core logic of the respective system. After the core logic samples the respective service request signals in the core logic domain, it acknowledges back with respective acknowledge signals, shown as ACK 1, ACK 2, ACK 3, ACK 4 and ACK 5, respectively, which are synchronous to a core logic domain clock. Each transaction at T1–T5 has a variable delay (VD) time period separating an assertion of a request signal and an acknowledge signal, shown as VD 1, VD 2, VD 3, VD 4 and VD 5, respectively. The respective delays VD 1–VD 5 may not be the same and may be variable with respect to each other, unlike as illustrated in FIG. 2.

As will be described in detail below, in spite of uncertain delay during the time from a request to an acknowledge for each individual transaction T1–T5, the respective REQUEST signals are asserted in consecutive cycles of the system interface domain clock even though prior transactions have not been completed. Corresponding and respective acknowledge signals (ACK) are shown asserted in consecutive cycles of the core logic domain clock in the same order as the respective REQUEST signals, each after the respective one of the variable delays VD 1–VD 5. It is noted, however, that depending upon the respective frequencies of the core logic and system interface domain clocks, one or more cycles of the core logic domain clock may be inserted between consecutive assertions of the acknowledge signals. It is important to note that the acknowledge signals are nonetheless asserted in order (i.e. sequential) to ensure error-free data transfer. In this manner, multiple transactions are issued in parallel, thereby effectively pipelining data transfer across the interface to achieve maximum throughput with full handshakes.

Figure 3:
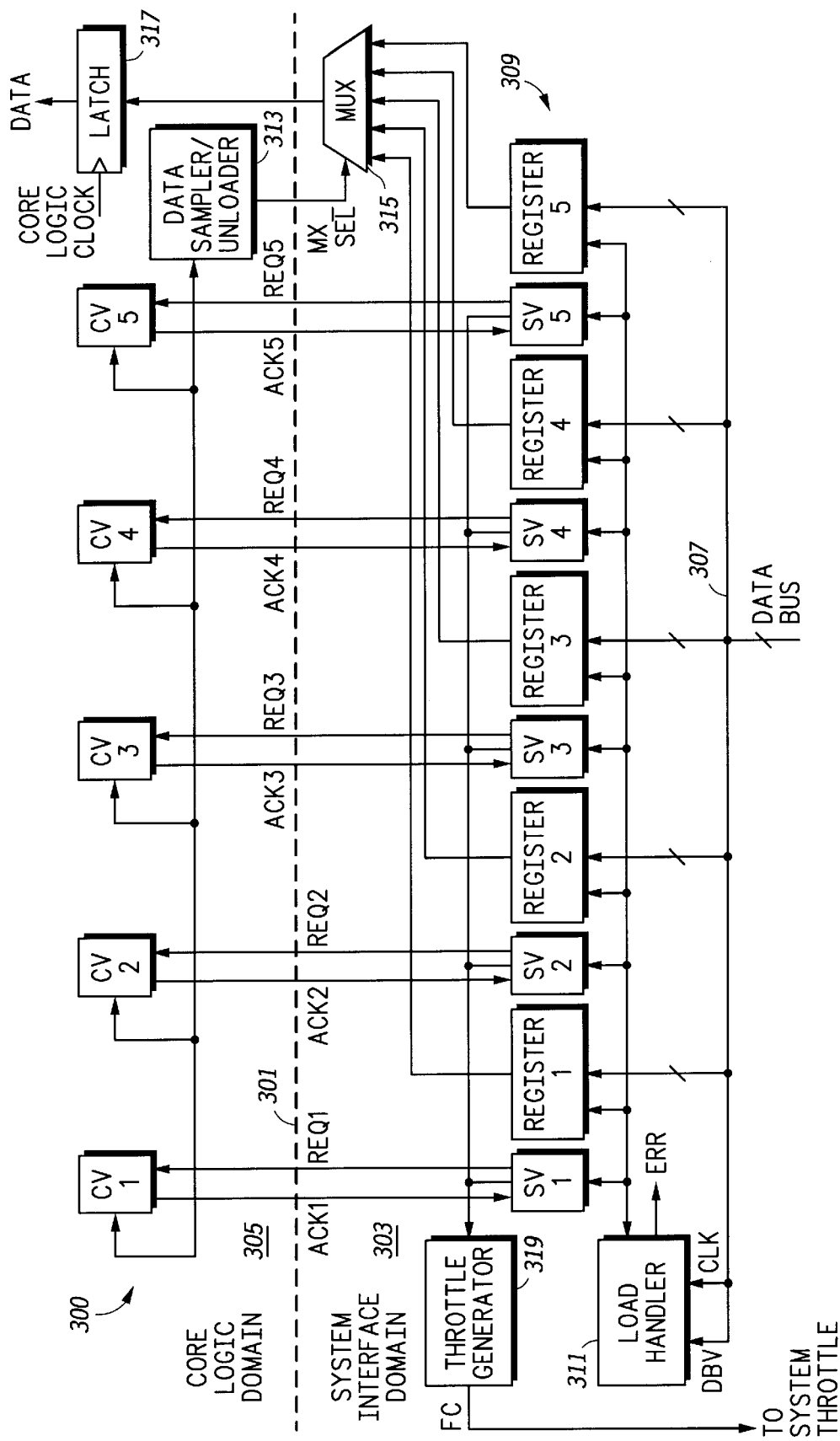
FIG. 3 illustrates in block diagram form a parallel full handshake pipeline synchronizer for synchronizing data across an asynchronous interface according to the present invention.

FIG. 3 is a block diagram of a parallel full handshake pipeline synchronizer 300 implemented according to the present invention. The synchronizer 300 is utilized to synchronize the data transfer between a receiver, such as the receivers 106 or 113 in FIG. 1, and the corresponding core logic of the respective system, such as the systems 103 or 107, respectively. A dashed line 301 represents the asynchronous interface between the system interface domain 303 and the core logic domain 305 across the asynchronous interface 301. For example, circuitry above the asynchronous interface 301 is implemented in corresponding core logic of each of system 103 and 107, and circuitry below the aysnchronous interface 301 is implemented in each of receiver 106 and receiver 113, respectively. A data bus 307 transfers data from a transmitter, such as the transmitter 105 or 111, to a series of registers, labeled REGISTER 1, REGISTER 2, REGISTER 3, REGISTER 4, and REGISTER 5 stacked to form a flat circular first-in first-out (FIFO) 309 storage device. The data bus 307 further includes an embedded clock signal CLK which serves as a timing reference for the data asserted on the data bus 307. The data bus 307 also includes a Data Beat Valid (DBV) signal to indicate that a particular data beat is valid during a particular cycle of the CLK signal. The CLK and DBV signals are provided to a load handler 311 to enable the load handler 311 to generate load enable signals to the REGISTERs 1–5 of the FIFO 309 to latch or otherwise capture data from the data bus 307. Each REGISTER 1–5 has associated therewith a handshake valid bit in a validity indicator register in the system interface domain 303 shown as SV 1, SV 2, SV 3, SV 4 and SV 5, respectively. The validity indicator registers for SV 1–5 may be implemented as separate registers from each of REGISTERs 1–5 or may be implemented as individual storage bits within REGISTERs 1–5. In one embodiment, the load handler 311 sets the respective one of the SV 1–5 bits when the data is latched into the corresponding one of the REGISTERs 1–5 of the FIFO 309. Alternatively, the SV 1–5 bits are configured as registers, where each is automatically set when the respective one of the REGISTERs 1–5 is loaded with data.

Within the core logic domain 305 there are core logic handshake valid bits CV 1, CV 2, CV 3, CV 4 and CV 5 corresponding to the respective SV 1–5 bits of the FIFO 309. When set, the SV 1–5 bits cause corresponding request signals REQ 1, REQ 2, REQ 3, REQ 4, AND REQ 5 to be asserted across the asynchronous interface 301 to the corresponding CV 1–5 bits. The CV 1–5 bits are set after sampling the assertion of the respective REQ 1–5 request signals. The CV 1–5 bits may also be configured as registers that are set in response to assertion of corresponding REQ-1–5 signals.

A data sampler/unloader 313 samples the CV 1–5 bits in an orderly fashion as further described below. Upon detecting that a CV 1–5 bit is set, the data sampler/unloader 313 generates a multiplex or select signal (MX_SEL) which is connected to a multiplexor (MUX) 315 to select the inputs of the multiplexor (MUX) 315 and causes the generation of a respective acknowledge signal, shown as ACK 1, ACK 2, ACK 3, ACK 4 and ACK 5, provided back to the respective SV 1–5 bits. The outputs of each of the REGISTERs 1–5 of the FIFO 309 are provided to respective inputs of the MUX 315. The MX_SEL signal selects the data from one of the REGISTERs 1–5 to be sampled by a data latch 317 operating in the core logic domain 305. After the latch 317 samples the data, the data sampler/unloader 313 resets the corresponding CV 1–5 bit and de-asserts the corresponding ACK 1–5 signal. An assertion of any of the ACK 1–5 signals causes the corresponding SV 1–5 bit to reset, thereby indicating the completion of data transfer for a particular transaction. To maintain proper ordering of data, upon system reset, the load handler 311 always points to a default starting register, such as REGISTER 1 of the FIFO 309. The data sampler/unloader 313 also points to the same default starting register by monitoring the corresponding one of the CV 1–5 bits, such as the CV 1 bit corresponding to REGISTER 1. When data is asserted on the data bus 307 as detected by the load handler 311 via the CLK and DBV signals, the load handler 311 latches or captures data into the REGISTERs 1–5 in a cyclic fashion. In particular, the first data beat is loaded into REGISTER 1, the second data beat is loaded into REGISTER 2 and so on up to REGISTER 5 and then the circuit operation wraps around back to REGISTER 1. The data sampler/unloader 313, by monitoring the CV 1–5 bits in the same, cyclic order, follows the same ordering while unloading the data from the FIFO 309 via the MUX 315. As an example, suppose three data beats A, B, and C are asserted on the data bus 307 in sequential order. The load handler 311 captures the data beats A, B and C into the respective registers, REGISTER 1, 2 and 3, of the FIFO

309. After data beat A is loaded into REGISTER 1, the SV 1 bit is set causing assertion of the REQ 1 signal. Likewise, after data beats B and C are loaded into REGISTERs 2 and 3, respectively, the SV 2 and SV 3 bits are set generating the REQ 2 and REQ 3 request signals. The assertion of the REQ 1–REQ 3 request signals is eventually sampled by the CV 1–3 bits, although not necessarily in that order due to metastability. The data sampler/unloader 313 is parked at the CV 1 bit until it is detected being set by the REQ 1 request signal. When the CV 1 bit is set, the data sampler/unloader 313 asserts the ACK 1 signal back to SV 1 bit and generates the MX_SEL signal to the MUX 315 to multiplex the data beat A from REGISTER 1 to be sampled by the latch 317. After the data beat A is latched by the latch 317, the data sampler/unloader 313 resets the CV 1 bit and de-asserts the ACK 1 signal back to the SV 1 bit. Assertion of ACK 1 signal causes the SV1 bit to reset and the REQ 1 request signal is de-asserted.

Meanwhile, the data sampler/unloader 313 increments to the next CV 2 bit and remains there until it is set. When the CV 2 bit is set upon sampling of the REQ 2 signal, the data sampler/unloader 313 asserts the ACK 2 signal back to SV 2 and also generates the MX_SEL signal to the MUX 315 to multiplex the data beat B from REGISTER 2 of the FIFO 309 to the latch 317. Operation continues in this manner until all of the data beats A, B, and C are multiplexed by the multiplexor 315 and latched by the latch 317 in that order and until all of the corresponding CV 1–3 and SV 1–3 bits are cleared. The data sampler/unloader 313 then remains parked at the CV 4 bit and the load handler 311 remains parked at REGISTER 4 of the FIFO 309. Another set of data such as data bits D, E, and F are subsequently loaded into REGISTERs 4, 5 and 1, in that order, and unloaded by the data sampler/unloader 313 by sampling the CV 4, CV 5 and CV 1 bits being set, in the same order. Operation repeats in this manner through all subsequent data beats in a similar manner.

The load handler 311 also detects errors such as overwriting a valid entry when the system interface domain 303 is operating at significantly higher frequency than the core logic domain 305. In particular, the load handler 311 detects an error and asserts a corresponding ERR signal when data is about to be loaded into a register of the FIFO 309 that already has its corresponding SV 1–5 bit set. Load handler 311 does this detection function by using the DBV signal received via data bus 307 and monitoring when the DBV signal is asserted valid. This error detection capability facilitates easy error recovery of the system and provides better debug capabilities.

A throttle generator 319 monitors each of the SV 1–5 bits for purposes of flow control. For example, when the throttle generator 319 detects any predetermined number of asserted SV1–SV5 bits, it asserts a flow control (FC) signal back to the transmitter informing the transmitter to pace the data being transmitted via the data bus 307. By throttling the transmitter in this manner, the synchronizer 300 has sufficient time to empty the FIFO 309 to prevent overflow. For example, the throttle generator 319 may assert the FC signal upon detection of three (3) or more of the SV 1–5 bits set at the same time, indicating a potential overflow condition.

Figure 4:
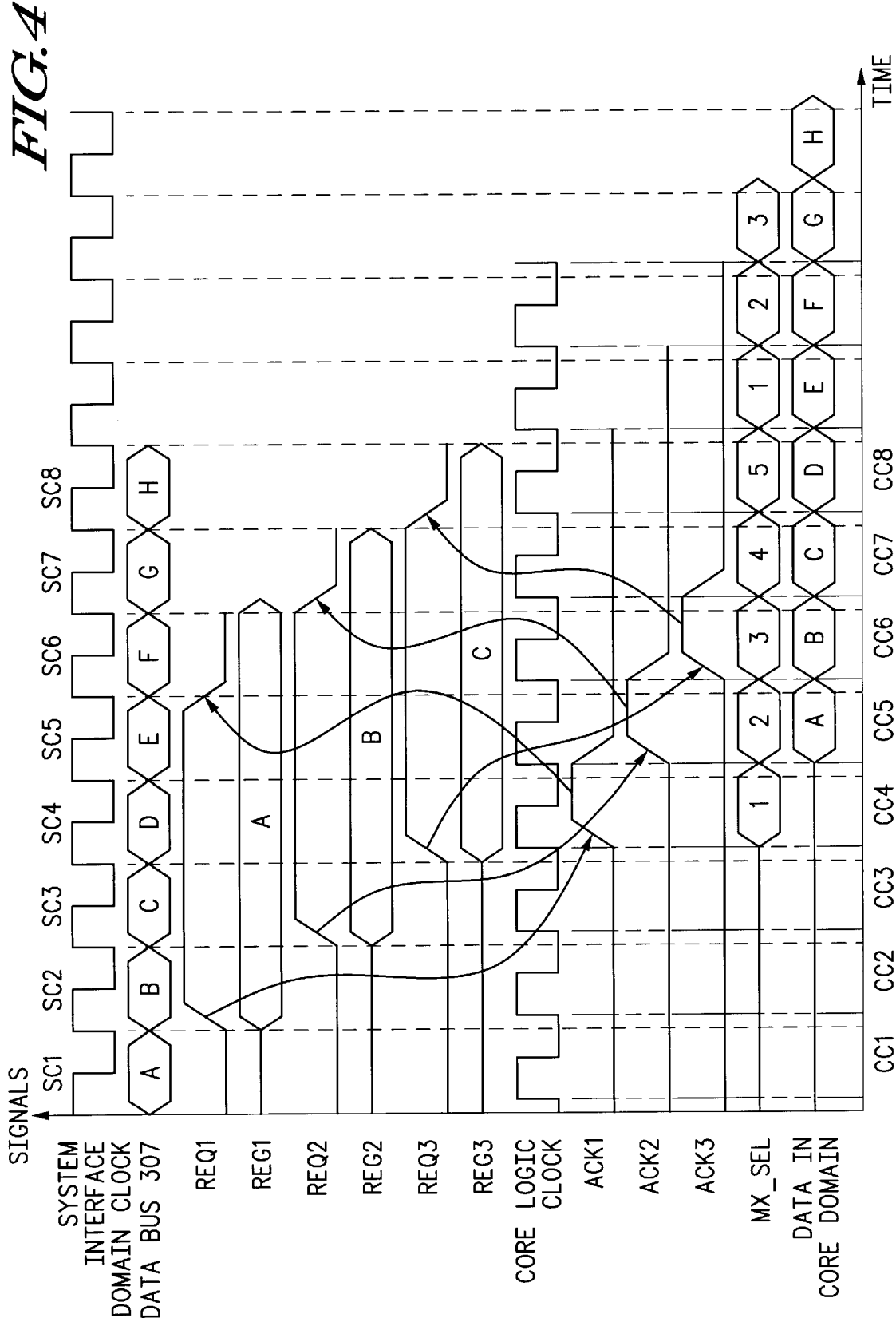
FIG. 4 illustrates in timing diagram form the asynchronous handshake pipelining timing of the synchronizer of FIG. 3.

FIG. 4 is a timing diagram showing operation of the synchronizer 300 illustrating parallel pipelined data flow from the system interface domain 303 to the core logic domain 305 of FIG. 3. A system interface domain clock is shown with respective cycles SC1, SC2, SC3, etc. Data beats A, B, C, D, E, F, G and H are asserted on the data bus 307 synchronized with the system interface domain clock and corresponding cycles SC1–SC8 as shown. The load handler 311 captures data beats into the REGISTERs 1–5 of the FIFO 309 as previously described. The contents of the REGISTERs 1–3 in FIG. 4 are labeled with names REG1, REG2 and REG3, respectively. For simplicity, only the data beats A, B and C are illustrated as being latched into the corresponding REGISTERs 1–3. In particular, after the data handler 311 captures the data beat A into REGISTER 1 (REG1), the SV 1 bit asserts the REQ 1 signal during clock cycle SC2. The data beat A is loaded into REGISTER 1 beginning at clock cycle SC2. Likewise, the REQ 2 and REQ 3 signals are asserted during clock cycles SC3 and SC4, respectively, while the data beats B and C are captured into the registers 2 and 3 beginning at clock cycles SC3 and SC4, respectively, as shown.

A core logic clock is also shown illustrated with respect to clock cycle CC1, CC2, CC3, etc. After the REQ 1 signal is asserted, the CV 1 bit detects assertion of the REQ 1 signal and is set. The data sampler/unloader 313 detects the CV 1 bit set and asserts the ACK 1 signal and the MX_SEL signal to the MUX 315 during clock cycle CC4, resets the CV 1 bit, and also de-asserts the ACK 1 signal during clock cycle CC5. Further, the data beat A is latched by latch 317 during the clock cycle CC5. The assertion of the ACK 1 signal during clock cycle CC4 causes SV1 to reset and causes de-assertion of the REQ 1 signal during a subsequent clock cycle, such as SC6. The assertion of the REQ 2 signal during clock cycle SC3 eventually causes assertion of the ACK 2 signal. Due to the pipelining nature of the synchronizer 300, the ACK 2 signal is asserted during clock cycle CC5 following assertion of the ACK 1 signal during clock cycle CC4. Also, the data sampler/unloader 313 asserts the ACK 2 signal and the MX_SEL signal to select the REGISTER 2 (REG2) of the FIFO 309 during the clock cycle CC5. Selection of the REGISTER 2 during the clock cycle CC5 causes reset of the CV 2 bit, and also causes de-assertion of the ACK 2 signal at the beginning of the next clock cycle CC6. Further, the data beat B is latched by latch 317 during the clock cycle CC6. Also, assertion of the ACK 2 signal during clock cycle CC5 eventually causes de-assertion of the REQ 2 signal, such as during the system interface domain clock cycle SC7. In a similar manner, assertion of the REQ 3 signal during the system interface domain clock cycle SC4 eventually causes assertion of the ACK 3 signal and the generation of MX_SEL signal to select REGISTER 3 (REG3) during the clock cycle CC6. The assertion of the ACK 3 signal during clock cycle CC6 eventually causes de-assertion of the REQ 3 signal at the beginning of the clock cycle SC8. Further, the data beat C is latched by latch 317 during the clock cycle CC7. In this manner, it is shown that data is capture and latched during consecutive cycles of the core logic domain clock after a delay of four (4) clock cycles.

Figure 5:
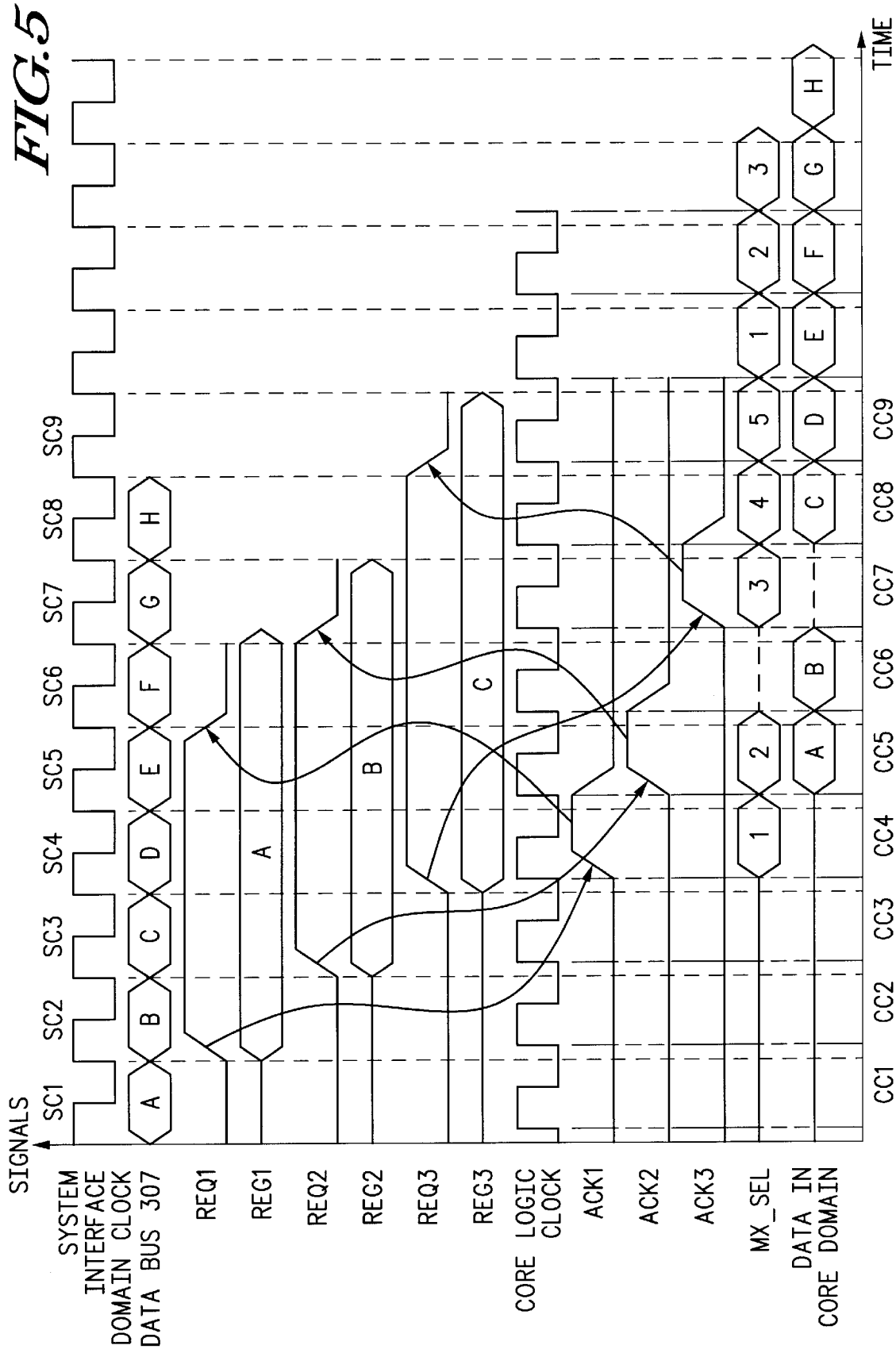
FIG. 5 illustrates in timing diagram form a variable transfer delay across the asynchronous interface of the synchronizer of FIG. 3.

FIG. 5 is a timing diagram showing operation of the synchronizer 300 and further illustrating the effect of a variable delay. The timing diagram shown in FIG. 5 is very similar to the timing diagram shown in FIG. 4 and operation is very similar. However, metastability causes the data sampler/unloader 313 to pause at the CV 3 bit so that operation is delayed by one core logic clock cycle. In particular, the data sampler/unloader 313 does not detect the CV 3 bit set until clock cycle CC7. After a delay of one core logic clock cycle, the data sampler/unloader 313 asserts the MX_SEL signal to the MUX 315 during the clock cycle CC7. Also, the ACK 3 signal is asserted during the clock cycle CC7 and de-asserted at the beginning of the clock cycle CC8. Assertion of the ACK 3 signal ultimately causes de-assertion of the REQ3 signal such as at the beginning of the clock cycle SC9.

It is appreciated that metastability may cause the CV 1–5 bits to be set out of order. Nonetheless, the data sampler/unloader 313 samples the CV 1–5 bits in order so that metastability concerns are eliminated and data ordering is maintained. The throttle generator 319 asserts the FC signal to prevent or otherwise reduce the possibility of overflow. If the core logic domain clock is at least as fast as the system interface domain clock, then data transfer across the asynchronous interface 301 using the synchronizer 300 may occur as fast as data arrives at the FIFO 309 after an initial delay, such as the delay VD 1, as shown in FIG. 2.

By now it should be apparent that there has been provided a method and apparatus for error-free and high throughput data transmission across an asynchronous interface. Desired pipelining of an asynchronous interface is achieved by sending transactions in parallel across the interface to achieve a high throughput. Because of the parallel structure of the interface, new transactions do not take the same path as an uncompleted transaction. The parallel feature allows a receiver to get one transaction every clock cycle. Additionally, input data can be throttled so that data is not dropped if FIFO 309 is full. If the flat circular FIFO 309 were to overrun for some reason, the overrun can be detected with this method because of data being written into an entry whose valid bit is still set. Therefore, the present invention readily supports debug capabilities and helps establish the best and worst case frequency ratio across the interface.

Therefore, it is intended that this invention encompass all such variations and modifications as fall within the scope of the appended claims.

What is claimed is:

1. A data synchronizer in a first system having a first clock which interfaces with a second system having a second clock which differs in frequency from the first clock, comprising:
   a plurality of parallel information registers, each of the plurality of information registers storing received information from the second system and having a valid bit associated therewith;
   a plurality of validity indicator registers, each of the plurality of validity indicator registers being coupled to a predetermined one of the valid bits and being set in response to the predetermined one of the valid bits being set;
   interface logic coupled to the plurality of validity indicator registers, the interface logic detecting when any of the valid data registers have been set and causing an acknowledge signal to be generated and sent to respective parallel information registers in response, the interface logic also providing a control signal; and
   an output multiplexor coupled to each of the plurality of parallel information registers for selectively providing the information synchronous to the first clock in response to the control signal.

2. The data synchronizer of claim 1 further comprising:
   a latch coupled to the output multiplexor for storing the information provided by the output multiplexor, the latch being clocked by the first clock.

3. The data synchronizer of claim 1 wherein the plurality of validity indicator registers are loaded with information in a predetermined order and the plurality of validity indicator registers are read in the same predetermined order.

4. The data synchronizer of claim 1 wherein the receipt of information by any of the plurality of parallel information registers causes the validity bit of each of the information registers to be set.

5. The data synchronizer of claim 1 wherein the acknowledge signal sent to respective parallel information registers by the interface logic causes the validity bit of the respective parallel information registers to be cleared.

6. The data synchronizer of claim 1 further comprising:
   throttle generator logic coupled to either a second predetermined number of the valid bits of the parallel information registers or to the second predetermined number of validity indicator registers for sensing when a maximum limit of valid bits are set, and generating a throttle signal in response.

7. The data synchronizer of claim 6 wherein the throttle signal indicates to the second system that information transfer to the first system should be temporarily stopped.

8. The data synchronizer of claim 1 further comprising:
   load logic coupled to the plurality of parallel information registers and the plurality of validity indicator registers, the load logic detecting if any information is about to be loaded into any of the parallel information registers which has a corresponding one of the plurality of validity indicator registers set and providing an error signal in response to the detecting.

9. A method for synchronizing information between two different clock domains, comprising the steps of:
   receiving and storing multiple frames of information in a first of the two different clock domains, each of the frames of information having full handshake control information for controlling the exchange of information between the two different clock domains; and
   transferring in parallel two or more of the full handshake control information between the two different clock domains to permit efficient exchanging of information between the two different clock domains, wherein transferring further comprises:
   detecting when any of a plurality of validity indicators in a second of the two different clock domains have been set and causing an acknowledge signal to be generated and sent to the first of the two different clock domains.

10. The method of claim 9 wherein the step of receiving and storing multiple frames of information further comprises the step of:
    pipelining the storage of the multiple frames of information in a first clock domain of the two different clock domains by storing a portion of each of the multiple frames of information in subsequent clock cycles of the first clock domain.

11. The method of claim 9 further comprising the step of receiving and storing multiple frames of information further comprises the step of:
    sizing a storage device for the storing of multiple frames of information, the sizing being determined by a calculation of the bandwidth of the incoming information in a first clock domain of the two different clock domains.

12. The method of claim 9 wherein the transferring in parallel of two or more of the full handshake control information between the two different clock domains further comprises transferring handshake control information in the form of validity bits between storage devices in each of the two different clock domains in a predetermined order.

13. The method of claim 9 further comprising the step of:
    limiting the receipt of data by a first clock domain of the two different clock domains based upon status of the full handshake control information in the first clock domain.

14. The method of claim 9 wherein the two different clock domains are implemented either on a single integrated circuit or are physically implemented on two different integrated circuits.

15. The method of claim 9 wherein the two different clock domains are coupled via a wireless connection.

16. The method of claim 9 further comprising the step of:
   detecting if any information is about to be stored in the first clock domain when a predetermined one of a plurality of validity indicators is set and providing an error signal in response to the detecting.

17. A pipelined and parallel full-handshake data synchronizer for interfacing first and second clock domains, the first time domain comprising:
   a plurality of parallel-connected storage devices, each of the storage devices receiving data of predetermined size and a validity bit indicating that data which is received is valid; and
   a multiplexor coupled to each of the plurality of parallel-connected storage devices for selectively outputting the data in response to a control signal;
   the second clock domain comprising:
      a plurality of validity verification logic circuits, each of the validity verification logic circuits being connected to a predetermined validity bit of the storage devices, the storage devices and validity verification logic circuits providing a full handshake mechanism whereby a set validity bit in the storage devices automatically sets a predetermined one of the validity verification logic circuits; and
      sampling and unloading logic coupled to the plurality of validity verification logic circuits, the sampling and unloading logic sampling the plurality of validity verification logic circuits in a predetermined order to generate the control signal and control the resetting of validity bits in the plurality of parallel-connected storage devices.

18. The pipelined and parallel full-handshake data synchronizer of claim 17 wherein the first clock domain further comprises:
   throttle control circuitry coupled to a predetermined number of the validity bits for generating a throttle signal when a limit of set validity bits is reached.

19. The pipelined and parallel full-handshake data synchronizer of claim 18 wherein the throttle signal temporarily halts the supply of data to the plurality of parallel-connected storage devices.

20. The pipelined and parallel full-handshake data synchronizer of claim 17 wherein the first time domain further comprises:
   load handling logic for detecting if any data is about to be loaded into any of the parallel-connected storage devices which has a corresponding validity bit set and providing an error signal in response to the detecting.

* * * * *